United States Patent [19]

Lesea

[11] 4,117,270
[45] Sep. 26, 1978

[54] TELEPHONE ANSWERING AND CALL DIVERTING SYSTEM

[75] Inventor: Ronald A. Lesea, Redwood City, Calif.

[73] Assignee: Candela Electronics, Inc., Sunnyvale, Calif.

[21] Appl. No.: 772,487

[22] Filed: Feb. 28, 1977

[51] Int. Cl.² .......................................... H04M 3/54
[52] U.S. Cl. .......................... 179/18 BE; 179/27 FH
[58] Field of Search ........................ 179/18 BE, 27 FH

[56] References Cited

U.S. PATENT DOCUMENTS

| | | | |
|---|---|---|---|
| 3,521,003 | 7/1970 | Andersson et al. | 179/18 BE |
| 3,704,346 | 11/1972 | Smith et al. | 179/18 BE |
| 3,925,622 | 12/1975 | Robinson | 179/18 BE |

*Primary Examiner*—William C. Cooper
*Attorney, Agent, or Firm*—Schatzel & Hamrick

[57] ABSTRACT

A telephone answering and call diverting system including a call diverter for sensing an incoming call on a first line and in response dialing a preset telephone number and transmitting a preset identification code both on a second line, for connecting the first and second lines together upon receipt of a connect command and for disconnecting both lines upon receipt of a disconnect command, and a call diverter controller and signal decoder for recognizing identification codes and for transmitting connect and disconnect commands.

12 Claims, 5 Drawing Figures

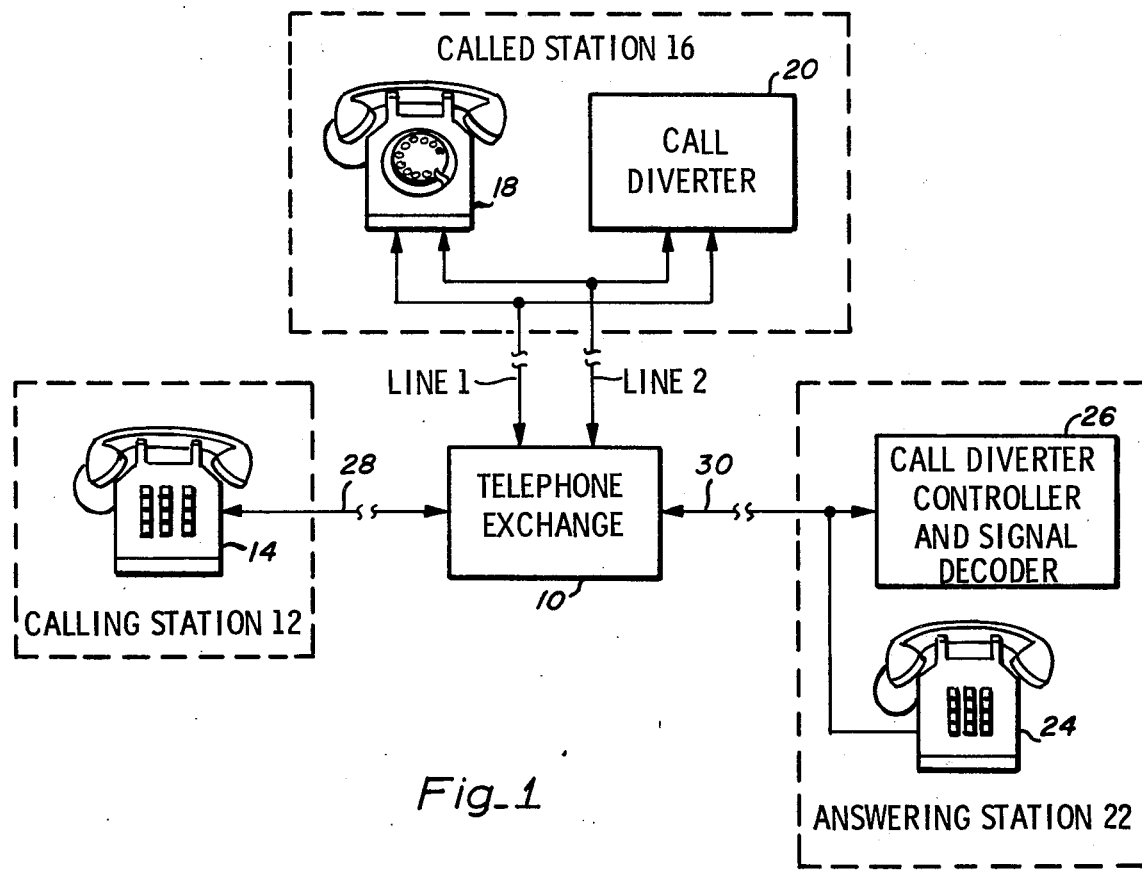
Fig_1

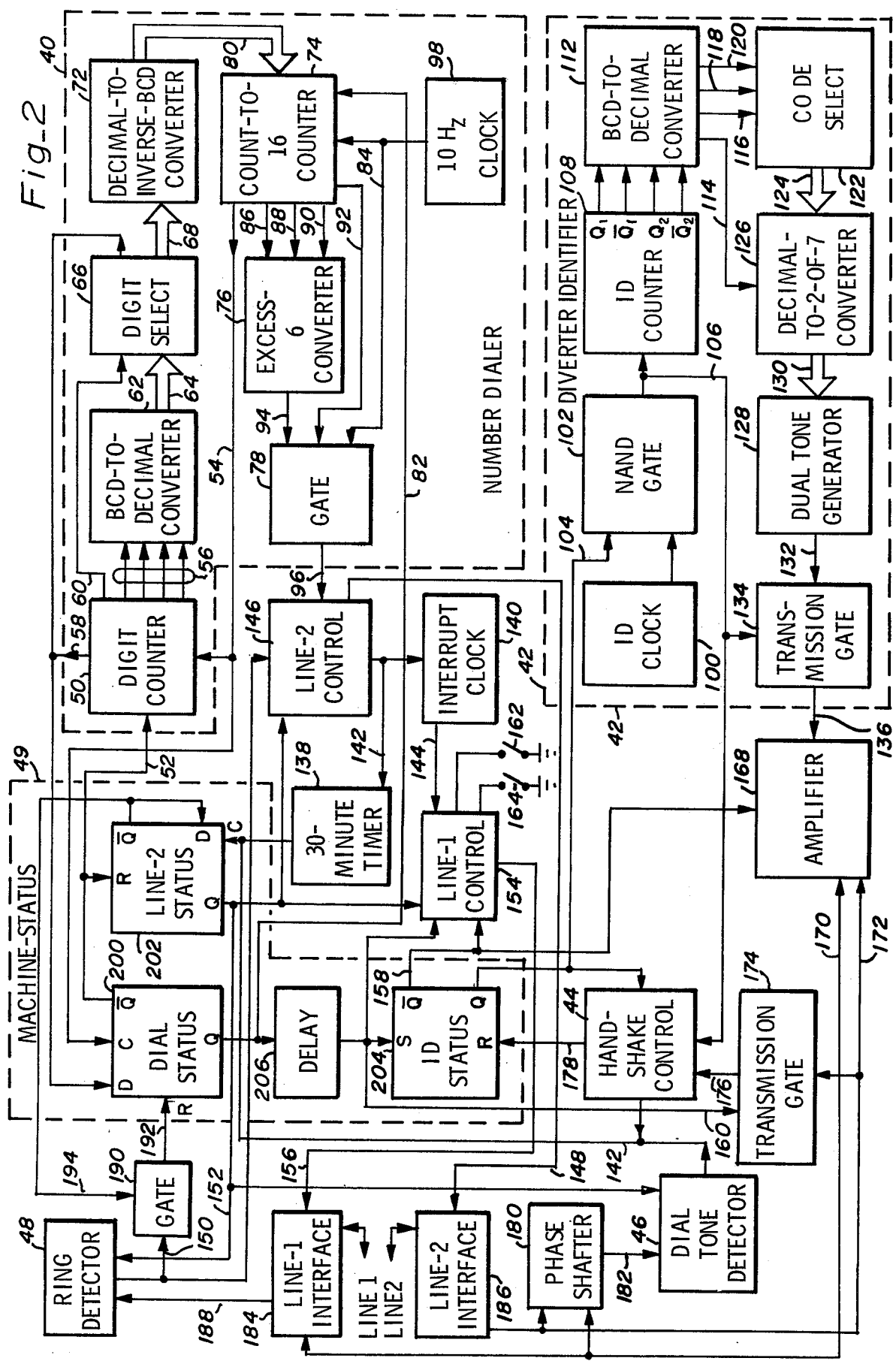

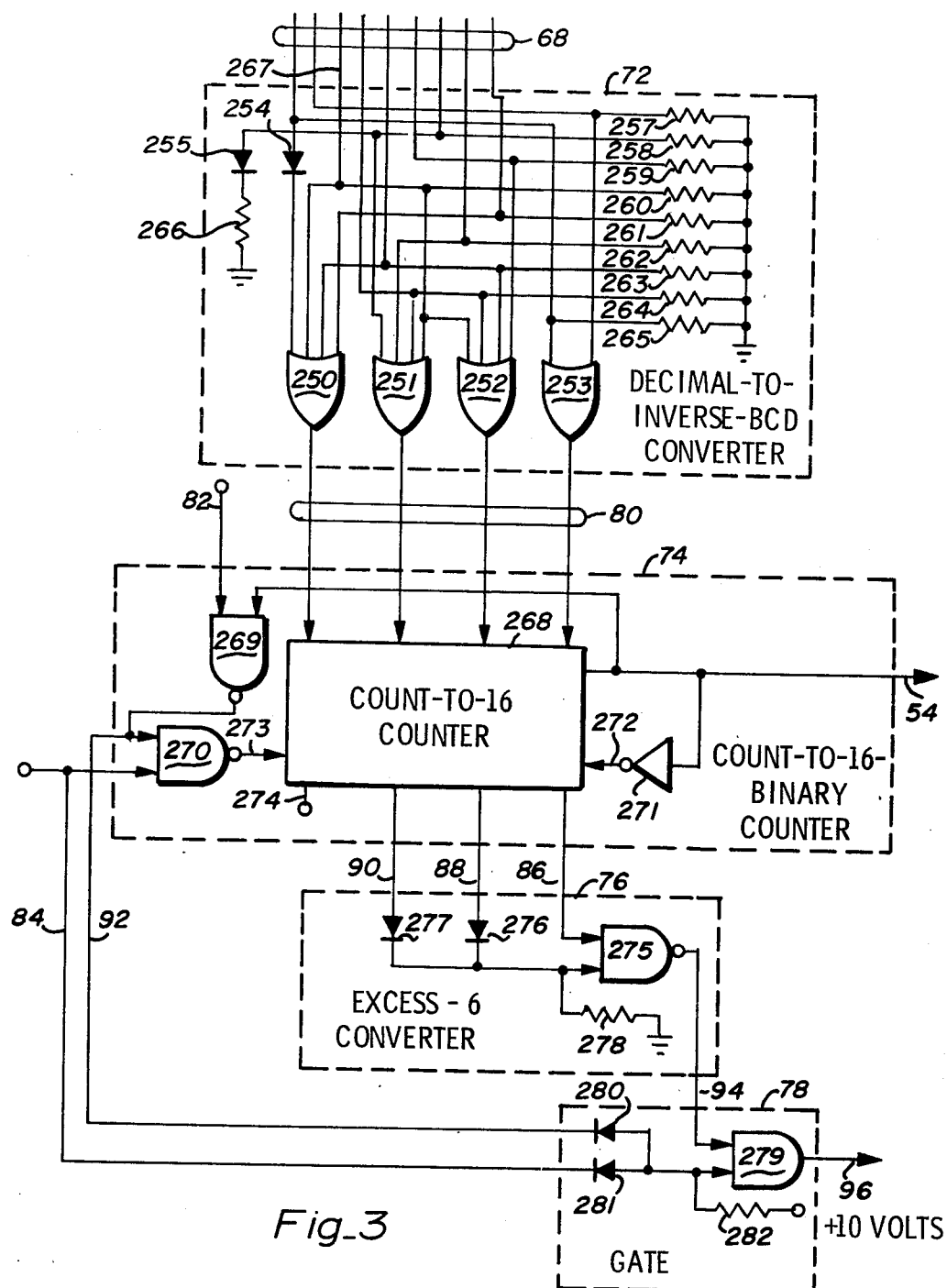
Fig_3
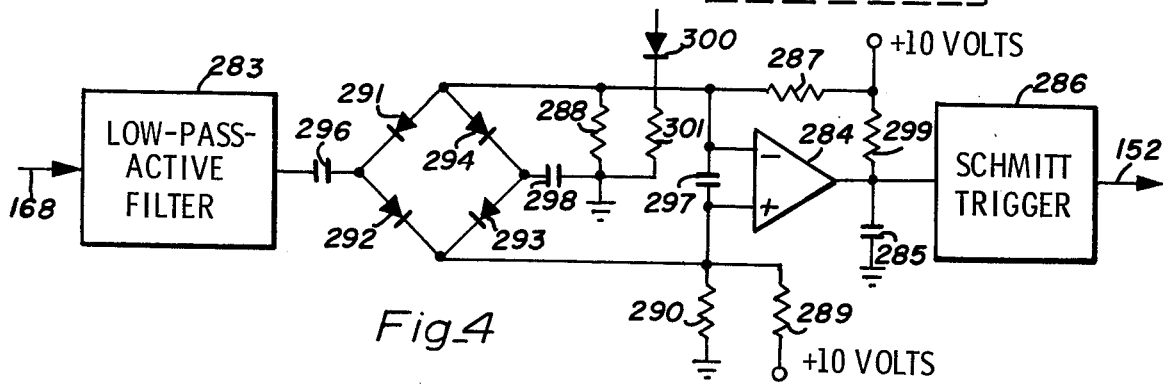
Fig_4

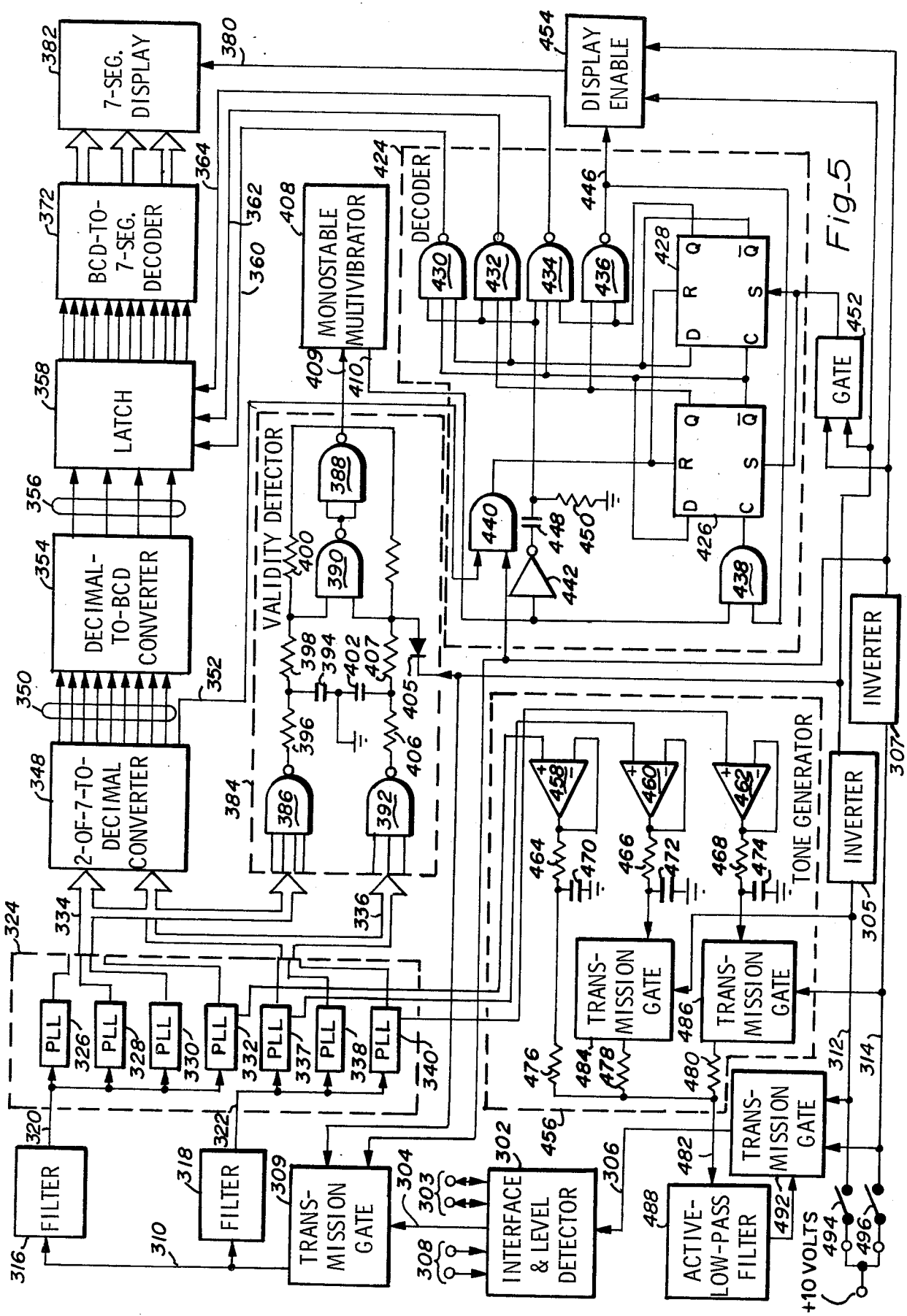

TELEPHONE ANSWERING AND CALL DIVERTING SYSTEM

BACKGROUND OF THE INVENTION

1. Field of the Invention

The present invention relates generally to call diversion devices and more particularly to telephone answering and call diverting systems having improved identification and control capability.

2. Description of the Prior Art

Devices for transferring telephone calls have been known in the past. Many of these devices, however, appraise the caller of the process either due to signals on the line or the answering service operator having to ask who the caller is calling. One expensive prior art approach requires the answering service to maintain a separate line for each customer. Another approach is disclosed in the U.S. Pat. to Smith et al, No. 3,704,346. This approach transmits an identification code upon command of the operator prior to transferring the call. The identification process, however, is both error prone and slow, requiring ten seconds to receive commands.

SUMMARY OF THE PRESENT INVENTION

It is therefore an object of the present invention to provide a telephone answering and call diverting system which can rapidly and accurately transmit identification and command signals.

Another object is to provide a system having an improved dial tone detector.

A further object is to provide a system having an improved telephone number dialer.

Still another object is to provide a system having an improved identification code processor and display.

Briefly, the preferred embodiment of the present invention includes a call diverter connected through two suitable telephone lines to a telephone exchange and a call diverter controller and signal decoder connected through a third suitable line to the exchange. The call diverter includes circuitry for recognizing an incoming call on the first line and in response dialing a preset telephone number followed by repeatedly transmitting a preset identification code both on the second line, for connecting the first and second lines together in response to a connect signal and for disconnecting the first and second lines in response to a disconnect signal.

An important advantage of the present invention is the ability to rapidly and accurately transmit and receive command and identification signals.

Another advantage of the present invention is the inclusion of improved dialing and dial tone detecting circuits.

These and other objects and advantages of the present invention will no doubt become apparent to those skilled in the art after having read the following detailed description of the preferred embodiment which is illustrated in the several figures of the drawing.

IN THE DRAWING

FIG. 1 is a block diagram generally illustrating the principal components of a telephone answering and call diverting system in accordance with the present invention;

FIG. 2 is a block diagram generally illustrating the principal components of a call diverter for use in a telephone answering and call diverting system FIG. 3 is a schematic diagram illustrating a portion of the dialer shown in FIG. 2;

FIG. 4 is a schematic illustration of the dial tone detector shown in FIG. 2; and FIG. 5 is a block diagram generally illustrating the principal components of a call diverter controller and signal decoder for use in a telephone answering and call diverting system.

DETAILED DESCRIPTION OF THE PREFERRED EMBODIMENT

A telephone answering and call diverting system is shown generally in FIG. 1 to include a telephone exchange 10, a calling station 12 having a telephone 14, a called station 16 having a telephone 18 and a call diverter 20, and an answering station 22 having a telephone 24 and a call diverter controller and signal decoder 26.

Telephone exchange 10 is a standard telephone switching system capable of routing and managing telephone calls. Although many telephone lines may be connected to the exchange, only four lines 1, 2, 28 and 30 are shown.

Telephones 14, 18 and 24 are standard telephone devices. Telephones 12 and 24 are connected to lines 28 and 30, respectively, and telephone 18 is capable of being connected to either of lines 1 or 2.

Call diverter 20 (discussed in detail below) is connected to both lines 1 and 2. In general, diverter 20 recognizes the presence of a ring signal on line 1 and in response dials a preset telephone number following which it transmits a preset identification code, both on line 2. Next, upon receipt of an acknowledge signal on line 2, diverter 20 connects lines 1 and 2 together. Finally, upon receipt of a disconnect signal diverter 20 disconnects both lines 1 and 2.

Call diverter controller/decoder 26 (also discussed in detail below) is connected to line 30. Controller/decoder 26 is capable of recognizing and displaying identification codes and transmitting connect and disconnect signals.

In operation, both the telephone number of line 30 to answering station 22 and a unique identification code assigned to called station 16 are first preset in diverter 20. Thereafter, whenever an incoming call is received on line 1, diverter 20 will divert the call to answering station 22. More specifically, when a calling party at station 12 dials on telephone 14 the telephone number of line 1 to called station 16, telephone exchange 10 will transmit a ring signal on line 1. Upon sensing the ring signal on line 1, call diverter 20 automatically dials the preset telephone number of line 30 to answering station 22 and then continuously transmits the preset identification code both on line 2. Upon receiving the dialed signal on line 2, the exchange generates a ring signal on line 30. When the receiver of telephone 24 is picked up by an answering service operator at station 22, the exchange disconnects the ring signal and connects line 2 to line 30 permitting receipt of the ID code by diverter controller/decoder 26. During this interval, the ring signal is still present on line 1, and the calling party 1 is unaware that the call is being diverted. When the controller/decoder displays the identification code, the operator can determine from the code the identity of the diverter and thus the called station. The operator then causes the controller/decoder to transmit a connect command signal causing the diverter to connect lines 1 and 2 together. This causes the exchange to cease transmitting a ring signal on line 1 and to connect lines 1 and 28 together. The operator then greets the calling party in an appropriate fashion. When the call is completed the operator causes the controller/decoder to send a disconnect command signal which causes the diverter to disconnect lines 1 and 2.

Referring now to FIG. 2, a block diagram of the preferred embodiment of a call diverter is shown to include a telephone number dialer 40, a diverter identifier 42, a hand-shake control 44, a dial tone detector 46, a ring detector 48, and a diverter machine-status controller 49. Dialer 40 includes a digit counter 50, which is a 4-bit binary counter such as that designated 40161. The counter receives a clearing signal on a line 52 and a clocking signal on a line 54 and outputs a binary sum on a line 56 and a count 10 signal on two lines 58 and 60. When line 52 is low, the counter is set to 0. When line 52 is high, the counter counts the low-to-high transitions from 0 to 15 of the counter clocking signal on line 54. The count 10 signal, which is high at count 10, is derived by combining in a suitable AND gate (not shown) the second and fourth order outputs from lines 56. The result is connected through suitable isolating diodes (also not shown) to two lines 58 and 60.

A conventional binary coded decimal (BCD)-to-decimal converter 62, such as that designated 4028, receives the binary sum signal, representing the binary numbers 0 through 9 on lines 56, and outputs a high level signal on one of the ten lines 64 corresponding to the number decoded. When a binary 10 is present or lines 56, the converter causes all of lines 64 to be low.

In the preferred embodiment, the ten lines 64 and line 60, which provide digit-designating signals to a digit selector 66, are connected within the selector through suitable isolating diodes (not shown) to a first terminal strip (not shown), labeled 1 through 11, respectively. Connected to a second terminal strip (not shown), labeled 1 through 9 and last digit, are the selector output lines, 9 lines 68 for the decimal number selected signals and line 58 for a last digit signal, respectively. Also included within the selector are suitable jumpers (also not shown) interconnecting the first and second terminal strips programming the selector to generate the telephone number to be called by the call diverter. Specifically, each terminal of the first strip corresponding to a digit of the telephone number is connected to a terminal of the second strip representing the decimal number corresponding to that digit, unless the number is 0 for which no connection is made, since 0 is redundant. The last terminal of the second strip, attached to line 58, is connected to the terminal of the first strip representing the last digit of the telephone number. Thus, if the telephone number programmed is 246-8024, terminals 1,2,3,4,6,7 and 7 of the first strip are connected to terminals 2,4,6,8,2,4 and last digit of the second strip, respectively.

Although in the preferred embodiment the selector uses jumpers and terminals, other devices for programming a telephone number, such as thumb wheel switches or an integrated circuit memory device, can also be used.

A decimal-to-inverse-BCD converter 72, a count-to-16 binary counter 74, an excess-6 converter 76 and a gate 78 are described in detail below. In general, converter 72 generates the inverse of the decimal number on lines 68, and converts the inverse number to a BCD representation on four lines 80. Thus, for a 1 input on lines 68, the BCD representation of 9, or 1001, will be present on lines 80; for a 2 input the BCD representation of 8 will be generated, etc.

Counter 74 receives the preset inputs on lines 80, a count enable on a line 82, and a clock input on a line 84 and generates a binary sum on three lines 86, 88 and 90, a count 15 output on line 54 and a count inhibit output on a line 92. When line 82 is low, counter 74 counts the high-to-low transitions of the clock pulses are line 84 beginning with a first number set by lines 80 and counting up to 16 at which time it loads the number on lines 80 and resumes counting. Although 4 binary count bits are generated, only the 3 most significant bits are connected to output lines 86, 88, and 90. Only during count 15 is a high level signal present on line 54. The negative going transition of this signal is used internally to load the next starting number from lines 80 into counter 74. Upon reaching the number 15 when line 82 is high further counting of counter 74 is inhibited and line 92 goes low. The binary sum (absent the least significant bit) on lines 86, 88 and 90 drives excess-6 converter 76 which generates a high level signal on a line 94 when the sum is less than 10. The sum state signal on line 94, count inhibit signal on line 92 and clock pulses on line 84 drive a conventional AND gate 78 which has a high level output when all of its inputs are high. Thus, gate 78 generates dialing pulses similar to the clock pulses, in the absence of a count inhibit signal and when the count is less than 10.

A clock 98 continuously generates the clock pulses at a 10 Hz rate, which are high for 40 milliseconds and low for 60 milliseconds on line 84.

Diverter identifier 42 includes an ID clock 100 driving one input to a NAND gate 102 at a 5 Hz rate. When the second input to the gate, a line 104, is high the clock pulses pass inverted to the gate output and a line 106.

A 2-bit ID counter 108 comprised of two D-type flip-flops (not shown), such as that designated 4013, counts clock pulses on line 106. The sum and its complement drive a 2-bit BCD-to-decimal converter 112. The preferred embodiment uses four 2-input AND gates (not shown) to perform the conversion. However, many of the common BCD-to-decimal converters can be employed. Converter 112 has four outputs 114, 116, 118 and 120. For binary inputs of 0, 1, 2 and 3 output lines 114, 116, 118 and 120, respectively, will be high.

In the preferred embodiment a code select 122 includes three input lines 116, 118 and 120 which are connected through suitable isolating diodes (not shown) to a first terminal strip (not shown) labeled 1 through 3 and nine output lines 124 connected to a second terminal strip (not shown) labeled 0 through 9. Up to three jumpers (also not shown) connect some or all of the three terminals of the first strip to terminals of the second strip, programming the three digit ID code the call diverter transmits. A jumper from the first, or digit, strip to the second, or number, strip assigns the selected number to that digit. The absence of a jumper on any of the first strip assigns the number 1 to that digit. Thus, for an ID code of 259, terminals 1, 2 and 3 of the first strip are connected to terminals 2, 5, and 9 of the second strip, respectively. Rather than programming the code select with jumpers, other devices such as thumb wheel switches or integrated circuit memories can also be used.

A decimal-to-2-of-7 converter 126 and a dual-tone frequency generator 128 provide a dual-tone multifrequency (DTMF) code of the type common in telephone circuits. In this code the numbers 0–9 and the two symbols * and # are each assigned two frequencies. For numbers 1, 2 and 3, a frequency of 697 Hz is generated; for 4, 5 and 6, 770 Hz; for 7, 8 and 9, 852 Hz; and for *, 0 and #, 941 Hz. Also generated in a frequency of 1,209 Hz for 1, 4, 7 and *; 1,336 Hz is generated for 2, 5, 8 and 0; and a 1,477 Hz signal is generated for 3, 6, 9 and #. This code and the tone frequencies were chosen because of their standardization although other frequencies or codes can also be employed.

Converter 126 consists of conventional OR gates, diodes and pull-down resistors (not shown). For an input on one of the lines 124, the corresponding 2-of-7 code is generated on five output lines 130. For an input on line 114 the 2-of-7 code for # is generated. No conversion is necessary for the number 1, as it is redundant. The dual-tone generator 128 is similar to the one described in my copending U.S. patent application entitled "Tone Encoder," Ser. No. 614,302 filed Sept. 17, 1975, although other dual-tone generators may also be employed. Absent an input on lines 130, the two oscillators of generator 128 will generate the dual-tone frequency combination appropriate for the number 1, and make it available on an output line 132. The 2-of-7 code present on lines 130 is used to switch frequency modifying components of the two signal generators so as to cause them to output a pair of frequencies corresponding to the number to be transmitted.

A transmission gate 134, having a control input connected through an inverter (not shown) to line 106, connects the dual-tone signals on line 132 to a line 136 when the signal level on line 106 is low.

A 30-minute timer 138 and an interrupt clock 140 are conventional clock circuits which are enabled by a high level signal on a line 142. Timer 138 provides a short hang-up clock pulse on a line 143 every 30 minutes. Clock 140 provides a short interrupt pulse on a line 144 every 1.5 minutes.

A line-2 control 146 includes suitable logic elements and relay driving circuits (not shown) to generate a suitable relay controlling signal on line 148 and a high level enable signal on line 142, if the dialing signal on line 96 is low and either a ring detect signal on a line 50 is high or a control signal on a line 152 is low.

Included in a line-1 control 154 are suitable logic elements and relay driving circuits to generate a relay controlling signal on a line 156 upon certain logic conditions. If the control signal on line 152 or the interrupt pulse on line 144 is high, the relay controlling signal will be absent. Otherwise, the signal will be present if a second control signal on a line 158 is high or if a third control signal on a line 160 is high after a delay determined by two switches 162 and 164. With neither switch closed, there is no delay; with one switch closed, there is a 15-second delay; and with both switches closed, a 30-second delay results.

Included in the call diverter is an amplifier 168 which is a standard switched-gain amplifier as is known in the art. Basically, a switched-gain amplifier only amplifies and passes signals in one direction at a time. Level detection and switching components monitor the level of signals flowing in each direction and switch the amplifier to amplify the strongest signal.

An audio path between 2 lines 170 and 172 through amplifier 168 is completed only when a high level control signal is present on line 158. The dual-tone ID signals on line 136 are always coupled to line 172.

A conventional transmission gate 174 connects the audio signal on line 172 to a line 176, and hand-shake control 44, when the control signal on line 160 is high. Conventional phase locked loops, transmission gates and digital logic elements (not shown) are included in control 44. Specifically, the audio input signal on line 176 drives three transmission gates which drive three phase-locked loops. The first and second loops, which are tuned to 941 Hz and 1209 Hz, respectively, the dual-tone combination for an *, drive a first OR gate which is converted to an output line 178. The second and third loops, tuned to 1209 and 1477 Hz, respectively, the dual-tone combination for a #, drive a second OR gate which drives output line 142. Digital logic elements driven by the clock pulses on line 106 and the control signal on line 104 control the transmission gates. When the clock pulses on 106 are low control 44 is turned off.

A high or low signal level on line 104 switches control 44 from monitoring for an * or a #, respectively.

A phase shifter 180 combines the audio dial tone signals on lines 170 and 172 after changing their relative phase. The phase shift prevents two dial tone signals of equal amplitude and opposite phase from cancelling when combined. The combined signals on a line 182 are detected in a dial tone detector 48, which is discussed below. The output of detector 48 on line 142, is a high level signal when a dial tone has been detected.

Before foreign devices are permitted to be connected to telephone lines, certain transformers and other matching and isolation devices are required. Such devices are included in a line-1 interfaced 184 and a line-2 interfaced 186 which connects line 1 to line 172 and line 2 to line 170, respectively. The connection to lines 1 and 2 are completed by relays (not shown) controlled by the presence of the relay controlling signals on lines 148 and 156, respectively. Also included in line-1 interface is a suitable optical isolator connecting telephone ring signals comprised of a 105 volt RMS signal present on line 1 to a ring detector 48. The optical connection is represented by line 188.

Ring detector 48 contains suitable charging circuits and a hysteresis-type level detector designed to avoid false triggering by transients. Ring detection is inhibited in the absence of a high level signal on line 152. The detected ring signal from detector 48 is coupled by way of line 150 to an AND gate 190. The output of gate 190 on a line 192, is high only when both line 150 and another line 194 are high.

Also included in the call diverter is a machine-status controller 40 comprised of three 2-state devices, a dial status 200, a line-2 status 202 and an ID status 204. Dial status 200 and line-2 status 202 are D-type flip-flops such as that designated 4013. A high level on the reset lines 192 and 52 forces the output lines 82 and 152 to the high level and the complement lines 52 and 194 to the low level for dial status 200 and line-2 status 202, respectively. A high level on the clock lines 54 and 142 clocks the state on the data lines 58 and 194 to the output lines 82 and 152 and its complement to lines 52 and 194, respectively.

ID status 204 is a R-S type flip-flop in which output line 104 is high and complement line 158 is low following receipt of a high level signal on set line 160. A high level signal on on line 178 resets ID status 204. A delay 206 provides a delay of 2 seconds between occurrence of an input signal on line 82 and an output signal on line 160.

When no calls are being diverted, dial status 200, line-2 status 202 and ID status 204 are in the states causing the signal level on lines 82, 152 and 158 to be high. When a telephone call is received on line 1, first, line-1 interface 184 couples the 105 volt RMS ring signal to detector 48 which raises the potential on line 150. The high level on line 150 causes line-2 control 146 to raise the potential on line 142, activating interrupt clock 140 and 30-minute timer 138, and to raise the potential on line 148, causing line-2 interface 186 to connect the call diverter to line 2. Second, the telephone company, upon detecting the connection to line 2, returns a dial tone which is coupled through line-2 interface 186 and phase shifter 180 to dial tone detector 46. Detector 46 raises the level on line 142 clocking line-2 status 202, making line 152 low and line 194 high. The high level on line 194 and ring detect signal on line 150 causes gate 190 to make line 192 high resetting dial status 200, which makes line 82 low and line 52 high. Third, the low level on line 152 both inhibits further ring detection by detector 48 and holds line-2 control 146 on. The low level on line 82 and the high level on line 52 initiate the line-2 dialing sequence.

Prior to the initiation of dialing sequence line 52 was low, clearing digit counter 50. The binary 0 from counter 50 caused BCD-to-decimal converter 62 to select the first output line of lines 64 which caused digit select 66 to output the first number to be dialed. For analysis, assume this first number was a 2. Then decimal-to-inverse-BCD converter 72 would have converted the 2 to the binary equivalent of an 8 available to count-to-16 binary counter 74 on lines 80. Also prior to initiation of dialing, line 82 was high holding counter 74 at count 15.

Upon initiation of dialing, line 52 will go high and line 82 low allowing both counter 50 and counter 74 to count. Counter 74 will count the next high-to-low transition on line 84 caused by clock 98, which count causes line 86 to go low. Although line 86 was high and just went low, it will be remembered that counter 50 only counts on low-to-high transitions and will thus remain unchanged. The high-to-low transition on line 84 causes counter 74 to load the number on lines 80, which in this case is an 8. Counter 74 will then proceed to count the clock pulses from clock 98 from the initial 8 through 15. During the next two clock pulses the sum in counter 74 is less than 10 causing the output of excess-6 converter 76 to be high. Since line 92 is also high the two clock pulses will pass through gate 79 causing line-2 control to interrupt line-2 twice. During the six clock pulses when the sum in counter 74 is between 10 and 15 inclusive, the output of converter 75 is low and no line 2 interruptions occur. The result is two 40 millisecond interruptions spaced 60 milliseconds apart with a 600 millisecond pause, as required for proper operation of the telephone switching equipment.

When counter 74 is clocked from 14 to 15, line 86 goes high clocking counter 50 from a binary 0 to a binary 1 and causing converter 62, digit select 66 and converter 72 to prepare the inverse of the next digit for loading into counter 74. When line 86 goes low following count 15 counter 74 loads the next number for dialing.

When the last digit to be dialed is reached, or should a malfunction occur when counter 50 reaches the 11th digit, line 58 will go high causing the data input to dial status 200 to go high. Then when counter 74 reaches 15 causing line 54 to go high clocking dial status 200, line 52 will go low and line 82 will go high inhibiting further dialing. The high level on line 82, following the delay caused by delay 206, will set ID status 204 initiating the ID sequence. The delay prevents the ID tones from interferring with the telephone switching operations.

During the ID sequence line 104 is high, thus AND gate 102 passes inverted clock pulses from ID clock 100 to ID counter 108. The pulses cause counter 108 to continuously count from 0 to 3 inclusive causing BCD-to-decimal converter 112 to sequentially raise the potential on lines 114, 116, 118 and 120. When line 114 is high decimal-to-2-of-7 converter 126 causes dual tone generator 128 to generate the dual-tone-frequency combination for a #. When lines 116, 118 and 120 are high, generator 128 generates the dual-tone combination for the ID numbers set by code select 122. Thus, if the ID code set is 259, line 132 will contain sequentially the dual-tone combinations for #, 2, 5, 9, #, 2, 5, 9, #, etc.

During each clock pulse of clock 100 as line 106 is low transmission gate 134 is on transmitting one character of the ID code on line 2. When line 106 is high no tones are transmitted and hand-shake control 44 monitors line 2 for the dual-tone combination for an *. The ID sequence will continue until control 44 detects an *, timer 138 determines thirty minutes have elapsed, or detector 46 detects a dial tone on line 2.

Should hand-shake control 44 detect the dual-tone combination corresponding to an * while the call diverter is in the ID sequence and while line 106 is high, control 44 will cause line 178 to go high resetting ID status 204 and terminating the ID sequence. When ID status 204 is reset, line 158 will go high and line-2 control 154 will cause line-1 interface 184 to complete the connection to line 1. This signals the telephone company to quit sending ring signals on line 1 and to interconnect the caller's line with line 1. Simultaneously, the low level signal on line 104 switches hand-shake control 44 to monitor for a # and causes amplifier 168 to complete an audio path between line 1 and line 2, completing the call diversion.

Should dial tone detector 46 detect a dial tone on either of lines 1 or 2, hand-shake control 44 detects the dual-tone combination for a # on either line, or should the thirty minutes set in 30-minute timer 138 expire, line 142 will go high clocking line-2 status 202. This causes line 152 to go high causing line-1 control 154 and line-2 control 146 to cause line-1 interface 184, and line-2 interface 148 to break the connections to lines 1 and 2, respectively, terminating the call and readying the diverter for another call.

Should dial tone be present on both lines 1 and 2, phase shifter 180 will prevent the tones from cancelling and dial tone detector 46 will still operate.

Every 1.5 minutes interrupt clock 140 will pulse line-1 control 154, causing line-1 interface 184 to briefly interrupt its connection with line 1. This is desirable because some telephone exchanges will not break the telephone connection until all parties have hung up. Without clock 140, on such an exchange, if both the caller and answering service operator hang up without hand-shake control 44 having received the dual-tone combination corresponding to a #, the call diverter will tie up both lines until 30-minute timer 138 pulses line 142.

Referring now to FIG. 3, a schematic diagram of the decimal-to-inverse-BCD converter 72, count-to-16 binary counter 74, excess-6 converter 76 and gate 78 are shown. Converter 72 includes four OR gates 250, 251, 252 and 253, two diodes 254 and 255 and ten resistors 256 through 266, inclusive. OR gates 250, 251, 252 and 253 are traditional devices such as a 4072, the output of which is high when one or more of their inputs are high. Diodes 254 and 255 eliminate the need for a fifth input to gate 250. Suitable resistors 257 through 266 provide a sink for the current flowing from the inputs of the gates maintaining the inputs at the low level absent an input signal.

Converter 72 is wired to generate the binary coded decimal equivalent of the inverse of the decimal number present on input lines 68. In operation, one of the nine input lines 68 is high corresponding to the number from 1 to 9 to be converted. For example, if line 267 corresponding to the number 3 is high the converter will generate the binary coded decimal equivalent of the inverse of 3. Since 7 is the inverse of 3 and the binary coded decimal equivalent of 7 is 0111, the output on lines 80 will so correspond. Line 267 is connected to one of the inputs of each of gates 250, 251 and 252 but not to an input of gate 253. Thus, for a high level signal on line 267 the outputs of gates 250, 251 and 252 will be high and the output of gate 253 low as required.

Counter 74 includes a 4-bit counter 268, such as that designated 40161, two NAND gates 269 and 270 and an inverter 271. Counter 268 receives preset signals on lines 80, a load signal on a line 272 and a clocking signal on a line 273 and generates a sum signal on lines 86, 88, 90 and a line 274 and a count 15 signal on line 54. A control signal and a clock signal are present on lines 82 and 84, respectively. Line 54 of the counter is high only on count 15. When the level on a line 272 goes from the low to the high state the binary number on lines 80 is loaded into the counter. Since line 54 is connected through inverter 271 to line 272, loading occurs on the high-to-low transition corresponding to the end of count 15.

Counter 268 is clocked by pulses on a line 273. Since the output of gate 270 will be low only when both of its inputs are high, the counter is clocked by the inverse of clock pulses on line 84 only when line 92 is high. Line 92 is high except when both lines 54 and 82 are high. Thus, the counter will be clocked by the inverse of each clock pulse on line 84 except when input 82 is high and the counter is at count 15. The three most significant bits of the binary count, on lines 86, 88 and 90, drive excess-6 converter 76.

Excess-6 converter 76 includes a NAND gate 275, two diodes 276 and 277 and a resistor 278. Diodes 276 and 277 are wired to generate the OR combination of signals on lines 88 and 90. Resistor 278 provides a sink for current from the input of gate 275 when both lines 88 and 90 are low. The output of gate 271, on line 94, will be low only when both of its inputs are high which occurs only if line 86 and either line 88 or 90 are high. Line 86 is high for binary numbers 8 through 15, inclusive; line 88 is high for binary numbers 4 through 7 and 2 through 15, inclusive; and line 90 is high for binary numbers 2, 3, 6, 7, 10, 11, 14, and 15. Thus, the output of gate 275 will be low only for the binary numbers 10–15, inclusive.

Gate 78 is comprised of an AND gate 279, two diodes 280 and 281 and a resistor 282. Diodes 280 and 281 and resistor 282 are wired in an AND configuration permitting the use of a 2-input gate for gate 279. The dial signal output of gate 279, on line 96, is high only when all of its inputs are high, which only occurs when the clock signal on line 84, the count enable signal on line 92 and the excess-6 output on line 94 are all high.

In operation, when line 82 is high counter 268 is held at count 15 and the output of gate 279 is low. During this time, however, numbers on lines 68 are converted to the binary equivalent of their inverse which binary numbers are present on lines 80. Thus, if line 267 is high corresponding to a decimal 3, the binary equivalent of a 7 is present on lines 80 as was discussed above.

When line 82 goes low, line 92 will go high and counter 268 will resume counting. Then, on the next high-to-low transition on line 84 the counter will be clocked causing line 54 to go low loading the binary number, in this case a binary 7, into the counter. On successive high-to-low transitions of the signal on line 84 the counter will count beginning with 7 and counting through 15. Following count 15 the counter will load the next number on lines 80 and continue counting. Since for the three numbers 7 through 9 the output of the counter is less than 10, the output of gate 275 is high and the output of gate 279 will go high three times as the three clock pulses on line 84 are high. For the numbers 10 through 15 gate 76 will go low and there will be a low output on line 96. Thus, for clock pulses at a 10 Hz rate on line 84, when a 3 is loaded into converter 72, three 40 millisecond pulses with 60 millisecond spacing followed by a 600 millisecond pause between numbers will be present on line 96 corresponding to telephone dialing requirements.

Referring to FIG. 4, a dial tone detector is shown to include generally a low-pass active filter 283, a comparator 284, a capacitor 285 and a Schmitt trigger 286. Filter 283 is a single-stage active filter having a cut-off frequency of 620 Hz. The filter passes all of the common telephone dial tone signals while rejecting much of the speech energy. Since many modern telephone exchanges use a 350 Hz dial tone signal, if only this type of dial tone signal is to be detected, a narrow band bandpass filter or phase-locked loop can be used in place of filter 283.

Comparator 284 is a standard comparator having an open collector output such as that designated 339. Alternatively, a regular comparator, or operational amplifier, driving the base of a transistor through a suitable resistor with the emitter of the transistor grounded and the collector serving as the output can be used.

Absent an input signal, comparator 284 is biased by four resistors 287, 288, 289 and 290 such that the comparator negative input is slightly more positive than the positive input. Typically, voltages of 5.2 and 4.8 volts are used. The biasing causes comparator 284 to hold capacitor 285 substantially at ground potential.

When a dial tone signal is present, the signal is rectified by a bridge rectifier formed by four diodes 291, 292, 293 and 294, biasing the amplifier's positive input more positive than the negative input. In particular, when the output of filter 283 goes high current flows through a blocking capacitor 296, diode 292, a filter capacitor 297, diode 294 and a second blocking capacitor 298 to ground. When the output of the filter goes low the current flows through capacitor 298, diode 293, capacitor 297, diode 291 and capacitor 296 to the filter. It should be noted that normally bridge rectifiers are driven by a double-ended source. In this case, however, the bridge rectifier is being driven by a single-ended source; namely, filter 283. The recitified signal charges capacitor 297 biasing the positive input of amplifier 284 more positive than the negative input. Amplifier 284 will then permit a charging resistor 299 to charge capacitor 285 to a potential sufficient to trigger Schmitt trigger 286. When line 152 is high (prior to dialing) a second charging path exists from line 152 through a diode 300 and a resistor 301 to capacitor 285 providing a second faster time constant. It will be noted that unlike a normal rectifier circuit having a short charging and long discharging time constant, the present circuit has a fast discharge and slow charge time constant. Capacitor 297 is made very small so as not to effect the discharge time constant. Typically, capacitor 297 is just large enough to prevent amplifier 284 from discharging capacitor 285 in between the half cycles of the rectified dial tone. The charging time constant of resistor 299 and capacitor 285 is set at around 8 seconds. When line 152 is high, the time constant is approximately 2 seconds.

Speech signals passing through filter 283 will not trigger the dial tone detector. Although the speech energy is rectified and biases amplifier 284 in a fashion allowing resistor 299 to charge capacitor 285, amplifier 284 discharges capacitor 285 during the pauses present between the speech syllables.

A block diagram of a call diverter controller and signal decoder suitable for use in a telephone answering and call diverting system is shown in FIG. 5. An interface and level detector circuit 302 includes a suitable transformer and other matching and isolation components (not shown) to interconnect the telephone line 303 to two lines 304 and 306. Also included in detector 302 is a relay and voltage detecting components (also not shown) connected to a line 308. When the voltage on line 308 is high indicating that the telephone is not connected to the line (on hook), the detector components cause the relay to disconnect the interface components from line 303. When the level falls indicating a connection (off hook), the detector causes the relay to connect the matching components to line 303. Although the interface and sensing devices are connected to separate lines, for most applications the lines would be connected together.

Two inverters 305 and 307 connected between two lines 312 and 314 and the control inputs of a transmission gate 309 cause the gate to disconnect line 304 from line 310 when either line 312 or 314 is high.

Two active elliptic filters each including four operational amplifiers and associated resistors and capacitors (not shown) are included in filters 316 and 318. The inputs of both filters 316 and 318 are connected to a line 310 and the outputs are connected to the lines 320 and 322 respectively. Filter 316 is designed to pass signals of frequency from 697 Hz to 941 Hz and to attenuate signals of frequency 1209 Hz and above. Filter 318 is designed to reject signals of frequency 941 Hz or less and to pass signals from 1209 Hz to 1477 Hz. Due to the close proximity of the pass and reject frequencies, elliptic filters are used that provide a minimum of 20 dB rejection throughout the reject frequency bands.

Seven phase-locked loops, such as those designated 567's, are included in a detector 324. Specifically, loops 326, 328, 330, and 332 are connected between input line 320 and four output lines 334 and are tuned to frequencies 697, 770, 852 and 941 Hz, respectively. The remaining three loops, 337, 338, and 340 are connected between input line 322 and three output lines 336, and are tuned to 1209, 1336 and 1477 Hz, respectively. Each loop upon detecting the presence of the frequency to which it is tuned causes its output to go from a high voltage state to a low voltage state.

Phase-locked loops are designed to indicate the presence or absence of an input signal at the frequency at which they have been tuned. Although not normally used as an output, a sawtooth signal at the frequency to which they are tuned is present on one of the pins of the loop. This signal for loops 332, 336 and 340 is connected to three lines 342, 344 and 346, respectively.

A 2-of-7-to-decimal converter 348 is comprised of seven inverters (not shown) each connected to one of lines 334 and 336 and drive ten 2-input AND gates (not shown) which drive nine lines 350 and a line 352. The gates are wired to provide ten outputs indicating the simultaneous presence of the two signals of the dual-tone multifrequency code discussed above. When one of the digits 1 through 9 is decoded, the corresponding line of lines 350 will go high. If a # is detected line 352 will be high.

A decimal-to-BCD converter 354 performs the usual function of generating a binary number on four lines 356 corresponding to which one of the nine lines 350 is high. An input line for 0 is redundant, since in the absence of a high level signal on any of lines 350, converter 359 generates a binary 0. A latch 358 includes three quad latches, such as those designated 4042, all of which are driven in parallel by the outputs of converter 354 and all of the latches are controlled by an enable line represented by three lines 360, 362, and 364. When the level on an enable line is low the outputs of the respective latch will follow the outputs of converter 354. When the level on the enable line is high the outputs of that latch will correspond to the outputs of converter 354 at the time the enable lines went high.

The three latches of latch 358 each drive one of the three BCD-to-7-segment decoder-drivers (not shown) included in a BCD-to-7-segment decoder 372. The decoders are standard devices, such as those designated 4511, which convert the binary number signals stored in latch 358 to the form required by 7-segment displays. When the level on a line 380 is high each decoder drives, through suitable current limiting resistors (not shown) one of three 7-segment displays (not shown) included in a display 382.

A validity detector circuit 384 includes four NAND gates 386, 388, 390 and 392. When any of the four inputs to gate 386, which are connected to lines 334, go low, the output of gate 386 will go high. The output of gate 386 charges a capacitor 394 through a suitable charging resistor 396. The potential on capacitor 394 and the potential on the output of gate 388 are summed through two suitable summing resistors 398 and 400, respectively, at an input to gate 390. In a similar fashion when one of the three lines 336, connected to the inputs of gate 392, goes low, the output of gate 392 will go high charging a capacitor 402 through a resistor 404. The potential on capacitor 402 is likewise summed with the potential on the output of gate 388 through two resistors 406 and 407 at the second input of gate 390. It will be seen that when either input to gate 390 is low the output of gate 388 is low, but if both inputs to gate 390 are high the output of gate 388 is high. When the output of gate 388 is low the potential on capacitor 394 and capacitor 402 must be higher to trigger the respective inputs of gate 390 than when the output of gate 388 is high, providing a hysteresis effect. Thus, the output of detector 384 will be high only when the potentials on one of lines 334 and one of lines 336 are simultaneously low and have been simultaneously low long enough to charge the respective capacitors 392 and 402. A diode 405, connected through inverter 304 to line 312, inhibits detector 384 when line 312 is high. The output of gate 388 drives a line 408.

A monostable multivibrator 408, having a normally high voltage level output, generates a low level output pulse on a line 410 for each low-to-high level transition on line 409.

A decoder 424 includes two D-type flip-flops 426 and 428, such as those designated 4013, four NAND gates 430, 432, 434, and 436, two AND gates 438 and 440 and an inverter 442. Flip-flops 426 and 428 are wired to count to four. The flip-flop outputs are decoded by gates 430, 432, 434, and 436 which are wired to provide a one of four output on lines 360, 362, 364 and a line 446, representing counts of 0, 1, 2, and 3, respectively, of the flip-flops. Also connected to an input of gates 430, 432 and 434, through a capacitor 448, is the output of inverter 442. The inverter and capacitor generate a short positive pulse for each high to low transition on line 410. Resistor 450 holds the inputs to the gates low absent such a pulse. Thus, the output of gates 430, 432 and 434 will be high unless a high-to-low transition occurs on line 410 during counts 0, 1, or 2 of the flip-flops, respectively. The output of gate 436 will be low during count 3.

Gate 438 clocks the flip-flops on the low-to-high transition of line 410 unless line 446 is low holding the flip-flops at count 3. The occurrence of a low level signal on line 314, which is coupled through inverter 307 to one input of gate 440, and a high level signal on line 352 causes gate 440 to reset the flip-flops to the 0 count. A high level signal on either of lines 312 or 314, a low level signal out of inverter 305 or 307, will cause gate 452 to set the flip-flops to the third count.

A display enable circuit 454 operates as a set-reset flip-flop. A high-to-low level transition on line 446 sets the circuit such that the output on line 380 will be high until a high level signal on line 314 resets the circuit, returning the potential on line 380 to the low level. A high level signal on line 312 inhibits the effect of a high-to-low transition on line 446.

A tone generator circuit 456 includes three operational amplifiers 458, 460 and 462 driven from lines 342, 343, and 346 and driving three low-pass RC filters comprised of three resistors 464, 466 and 468 and three capacitors 470, 472 and 474, respectively. The operational amplifiers serve as buffers to the saw-tooth signal present on the input lines. The waveforms are changed to a more sinusoidal nature by the action of the low-pass filters attenuating the harmonics in the signals. The signals are summed by resistors 476, 478 and 480 at line 482. The 941 Hz signal is always present on line 482 but the 1209 Hz and 1477 Hz signals are switched on by two transmission gates 484 and 486 when a high level signal is present on lines 312 and 314 respectively.

Connected to line 482 is a filter 488 which includes a single stage active low-pass filter designed to further attenuate the harmonics of the signals present on line 482. The output of the filter is connected through a transmission gate 492 to line 306 whenever the level on either of lines 312 or 314 is high.

Two normally open momentary contact switches, a connect command switch 494 and a disconnect command switch 496, are connected between a plus 10 volt potential and lines 312 and 314, respectively.

In operation, lines 303 and 308 of the call diverter controller and signal decoder are connected to the telephone line to be monitored. When a telephone connected to that line is taken off hook, the telephone line voltage drops. The drop is sensed by interface and level detector 302 which connects lines 304 and 306 through the matching and isolation components to the telephone line.

The telephone line voltage drop is also sensed by the telephone company, which, for an incoming call then disconnects the ringing signal and connects the telephone line with that of the calling party. Should the call be originated by a call diverter as described above, there will be on the line at this point a continuous series of dual-tone tone bursts separated by silence while the diverter monitors for commands. Typically, if the code being sent by the diverter is 259 the tones will consist of the dual-tone frequency combinations for #, 2, 5, 9 continuously repeated.

The dual-tone bursts will be connected by way of gate 309 to filters 316 and 318. The filters will separate the tones such that for each dual-tone combination the low frequency tone alone will be present on line 320 and the high frequency tone alone will be present on line 322.

One of phase-locked loops 326, 328, 330 or 332 of detector 324 will lock to each of the tones present on line 320 causing a corresponding one of lines 334 to go low. One of phase-locked loops 336, 338 or 340 will likewise lock to each of the tones present on line 322 causing the appropriate line of lines 334 to go low.

When the dual-tone combination corresponds to a number 1 through 9, 2-of-7-to-decimal converter 348 will cause the appropriate line of lines 350 to go high causing decimal-to-BCD converter 354 to output the binary equivalent of the number on lines 356. Otherwise, all of lines 350 will be low and converter 354 will output a binary 0. When the dual-tone combination corresponding to a # is present, converter 348 will cause line 352 to go high.

Simultaneously, as one each lines 334 and lines 336 go low, the output of gates 386 and 392 will go high. Following a time interval necessary to charge capacitors 394 and 402, both inputs to gate 390 will go high causing the output of gate 388 to go high. Due to the delay caused by charging capacitors 394 and 402, by the time gate 388 goes high, the appropriate binary number will already be present on lines 356. On the low-to-high transition of gate 388 monostable multivibrator 408 will be triggered generating an inverted pulse. Should only one tone be present on the input or the two tones not be present for a sufficient period of time both inputs to gate 390 will not be simultaneously high and there will be no output of gate 388.

Assuming the first dual-tone combination corresponds to a #, line 352 will be high causing the output of gate 440 to be high resetting flip-flops 426 and 428. Following the delay in tone valid 384, line 406 will go high causing an inverted pulse to be generated by multivibrator 408. The high-to-low transition of this pulse will cause inverter 442 and capacitor 448 to generate a positive pulse causing the output of NAND gate 430 to go low. This causes the first latch of latch 358 to load and store the binary 0 now present on lines 356. On the low-to-high transition of multivibrator 408, AND gate 440 will clock the flip-flops. The flip-flops will remain in the 0 state, however, because gate 440 is still resetting the flip-flops.

Should the next dual-tone combination correspond to the number 2, a binary 2 will be present on lines 356 and line 352 will be low. On the high-to-low transition of the output of multivibrator 408, inverter 442 will cause the output of gate 430 to go low loading the binary 2 into the first latch of latch 358. On the low-to-high transition of the output of multivibrator 408 gate 438 will clock the flip-flops to the 1st count addressing gate 432.

As a third and fourth dual-tone combination corresponding to the numbers 5 and 9 are received, in a similar fashion gates 432 and 434 will cause the second and third latches of latch 358 to store the binary equivalent of these numbers. Following the loading of the number 9 gate 438 will clock the flip-flops to the 3rd count causing the output of gate 436 to go low setting the display enable 454. This causes line 380 to go high which causes BCD-to-7-segment converter 372 to drive 7-segment display 382, thus displaying the ID code 259. A low level output of gate 436 also inhibits gate 338 from continuing to clock the flip-flops. During normal operation this is unnecessary because the next dual-tone combination will correspond to a # causing AND gate 440 to reset the flip-flops. Should a noise pulse be present, however, this feature minimizes the disruption to the display.

Should the first dual-tone combination received by the call diverter controller correspond to the second or third digit of the ID code, although these numbers will be loaded in improper order in latch 358, a # will be received before the flip-flops reach the third count. Thus, display enable 454 will remain reset and no signals will be displayed. The # will reset the flip-flops and subsequent dual-tone combinations will be loaded in proper order as was just discussed.

When the answering service operator has recognized the ID number displayed by display 382, the operator will operate connect command switch 494 transmitting a dual-tone combination corresponding to *. Switch 494 applies 10 volts to gate 484 causing it to pass the 1209 Hz signal which is combined with the 941 Hz signal already present on line 482. The signal is filtered by filter 488 and connected through gate 492, which is now also turned on, through interface 302 to the telephone line. The 10 volts on line 312 also causes gate 418 to set flip-flops 426 and 428 to the third state preventing gate 440 from clocking flip-flops 426 and 428 and thus preventing loading of latch 358 until the two-tone pair for the symbol # is received. This prevents voice communication on the telephone line from disrupting the ID code presentation.

When the call has been completed, the operator closes disconnect command switch 496 turning both gates 492 and 486 on. This causes the controller/decoder to transmit the dual-tone combination for a # which causes the call diverter to hang up both lines. The 10 volts on line 314 also cause gate 452 to set the flip-flops and causes inverter 307 to inhibit gate 440 from resetting the flip-flops. When either switch 494 or 496 is closed, causing the controller/decoder to transmit tones, the 10 volt potential on lines 312 or 314 turns off switch 309 preventing the diverter/decoder from attempting to recognize the tones being transmitted as ID codes.

Although it is contemplated that after having read the preceding disclosure certain alterations and modifications of the present invention will no doubt become apparent to those skilled in the art, it is intended that the following claims be interpreted to cover all such alterations and modifications as fall within the true spirit and scope of the invention.

What is claimed is:

1. A telephone call diverting and answering system comprising:

a telephone exchange means coupled to a calling station by a first telephone line, coupled to a called station by a second telephone line and a third telephone line, and coupled to an answering station by a fourth telephone line, said exchange means being responsive to a first dialed signal on said first line and operative to generate a ring signal on said second line and to connect said first line to said second line when a response to said ring signal is detected, said exchange means being further responsive to a second dialed signal on said third line and operative to generate a ring signal on said fourth line and to connect said third line to said fourth line when a response to said second ring signal is detected;

call diverting means disposed at said called station and coupled to said second and third lines, said diverting means being responsive to said first ring signal and operative to generate said second dialed signal and an identification code signal on said third line, responsive to a connect command signal on said third line and operative to connect said second line to said third line and responsive to a disconnect command signal developed on said third line and operative to disconnect said third line from said second line; and diverter control means disposed at said answering station and coupled to said fourth telephone line, said control means being operative to detect said identification code signal and to identify said called station, said diverter control means also including means for generating said connect signal whereby a call from said calling station to said called station will be diverted to said answering station with said answering station being able to determine the identity of said called station without the calling party knowing that the call has been diverted and means for generating said disconnect signal following the termination of a communication between the calling station and the answering station.

2. A telephone call diverting and answering system comprising:

a telephone exchange means coupled to a calling station by a first telephone line, coupled to a called station by a second telephone line and a third telephone line, and coupled to an answering station by a fourth telephone line, said exchange means being responsive to a first dialed signal on said first line and operative to generate a ring signal on said second line and to connect said first line to said second line when a response to said ring signal is detected, operative to generate a dial tone signal on said third line; and responsive to a second dialed signal on said third line and operative to generate a ring signal on said fourth line and to connect said third line to said fourth line when a response to said second ring signal is detected;

call diverting means disposed at said called station and coupled to said second and third lines, said diverting means being responsive to said first ring signal and operative to generate said second dialed signal and an identification code signal on said third line, said diverting means being additionally responsive to a connect command signal on said third line and operative to connect said second line to said third line, said call diverting means including, a ring detector responsive to said first ring signal and operative to develop a ring detect signal, a dial tone detector responsive to said dial tone signal and operative to develop a dial tone detect signal, a hand-shake detector responsive to said connect command signal and operative to develop a connect signal, dialer means responsive to said dial tone detect signal and operative to develop a dialing signal on said third line and operative to develop an end of dial signal following completion of said dialing signal, identifying means responsive to said end of dial signal and said connect signal and operative to develop said identification code signal, first line connecting means responsive to said connect signal and operative to connect said second and third lines together, and second line connecting means responsive to said ring detect signal and operative to couple said third line to said dialing tone detector, said hand-shake detector and said identification code signal; and diverter control means disposed at said answering station and coupled to said fourth telephone line, said control means being operative to detect said identification code signal and to identify said called station, said diverter control means also including means for generating said connect signal whereby a call from said calling station to said called station will automatically be diverted to said answering station with said answering station being able to determine the identity of said called station without the calling party knowing that the call has been diverted.

3. A telephone call diverting and answering system as recited in claim 2 wherein said dial tone detector includes, a low pass filter for passing said dial tone signal, a full wave bridge rectifier means having first, second, third and fourth terminals, said first terminal being coupled to the output of said filter by a DC blocking capacitor, said third terminal being coupled to a circuit ground by another DC blocking capacitor, an operational amplifier having a negative input terminal coupled to said fourth terminal and a positive input terminal connected to said second terminal, a capacitor coupling said negative input terminal to said positive input terminal, and an output terminal, power supply means normally biasing said negative input terminal slightly more positive than said positive input terminal so as to drive the output terminal of said amplifier to ground potential when no dial tone signal is passed through said input filter, a potential storage means coupled to said power supply means and said amplifier output terminal, said storage means being charged to a predetermined potential when a dial tone signal is passed through said filter and being discharged to ground potential by said amplifier when no dial tone signal is present, and a trigger circuit for developing said dial tone detect signal when the charge stored on said storage means exceeds said predetermined potential.

4. A telephone call diverting and answering system as recited in claim 3 wherein said potential means includes a storage capacitor and circuitry for charging said capacitor to said predetermined potential at a first rate and for discharging said capacitor at a second rate faster than said first rate.

5. A telephone call diverting and answering system as recited in claim 2 wherein said dialer means includes, a first counter responsive to said dial tone detect signal and operative to count first clock pulses input thereto and to develop a first binary output count, a BCD-to-decimal converter means for converting said first binary output count to a decimal output count, a digit select means having a plurality of first terminals each connected to one of the decimal output terminals of said BCD-to-decimal converter, a plurality of second terminals, and means for selectively connecting various ones of said first terminals to various ones of said second terminals so as to cause each digit of the dialed signal to be output in sequence, a decimal-to-inverse-decimal-to-BCD converter means for generating a binary output equivalent to the inverse of each of the dialed signal digits, a second counter which is set to begin each count at that of each said inverse dialed signal digits and to count to a predetermined terminal count at a rate determined by second clock pulses, said second counter developing one of said first clock pulses each time said terminal count is reached, said second counter also developing a second binary output corresponding to each count output, means responsive to said second binary output count and operative to develop a series of pulses for each said second count output less than a predetermined number whereby groups of pulses corresponding to each number of the dialed number are thereby developed, with each group of pulses being separated by the number of pulses occurring in the time that it takes said second counter to count from said predetermined number to said predetermined terminal count.

6. A telephone call diverting and answering system comprising:

a telephone exchange means coupled to a calling station by a first telephone line, coupled to a called station by a second telephone line and a third telephone line, and coupled to an answering station by a fourth telephone line, said exchange means being responsive to a first dialed signal on said first line and operative to generate a ring signal on said second line and to connect said first line to said second line when a response to said ring signal is detected, said exchange means being further responsive to a second dialed signal on said third line and operative to generate a ring signal on said fourth line and to connect said third line to said fourth line when a response to said second ring signal is detected;

call diverting means disposed at said called station and coupled to said second and third lines, said diverting means being responsive to said first ring signal and operative to generate said second dialed signal and an identification code signal including a repeated series of dual-tone multifrequency signals on said third line, said diverting means being additionally responsive to a connect command signal on said third line and operative to connect said second line to said third line; and diverter control means disposed at said answering station and coupled to said fourth telephone line, said control means being operative to detect said identification code signal and to identify said called station, said diverter control means also including means for generating said connect signal whereby a call from said calling station to said called station will automatically be diverted to said answering station with said answering station being able to determine the identity of said called station without the calling party knowing that the call has been diverted, said diverter controller means including, a detector means responsive to said dual-tone signals and operative to generate a two-of-seven identification output series corresponding to the series of signals detected, a two-of-seven-to-decimal converter means for converting said two-of-seven output series to a decimal identification series, and a display means responsive to said decimal series and operative to generate a display of each number of said decimal identification code identifying said station.

7. A telephone call diverting and answering system as recited in claim 2 wherein said detector means also generates first and second frequency signals, and wherein said connect signal generating means includes,
   a first amplifier means responsive to said first frequency signal and operative to develop a first amplified signal,
   a second amplifier means responsive to said second frequency signal and operative to develop a second amplified signal, and
   first gate means for combining said first amplified signal and said second amplified signal to develop said connect signal.

8. A telephone call diverting and answering system as recited in claim 7 wherein said diverting means is further responsive to a disconnect command signal developed on said third line and is operative to disconnect said third line from said second line, wherein said detector means also generates a third frequency signal and wherein said diverter controller means also includes,
   a third amplifier means responsive to said third frequency signal and operative to develop a third amplified signal, and
   second gate means for combining said first amplified signal and said third amplified signal to develop said disconnect signal.

9. A telephone call diverting and answering system as recited in claim 2 wherein said display means includes,
   a decoder means responsive to said two-of-seven series and operative to develop a count signal identifying the position of each said number within the series of the various dual-tone signals,
   a storage means for receiving said decimal series, said storage being responsive to said count signal and operative to store the numbers of said decimal series in a predetermined order, and means coupled to said storage means for displaying the stored numbers.

10. A telephone call diverting and answering system as recited in claim 9 wherein said dual-tone signals include a dual-tone timing signal and wherein said decoder means includes counting means responsive to said timing signal and operative to develop a count signal for causing said storage means to store the corresponding numbers of said decimal series.

11. A telephone call diverting and answering system as recited in claim 10 wherein said counting means is further operative to develop a display control signal for enabling said display when all of said numbers are stored in said storage means.

12. A telephone call diverting and answering system as recited in claim 9 wherein said series of dual-tone multifrequency signals includes the simultaneous presence of a high frequency signal series and a low frequency signal series and wherein said decoder further includes,
   a first gate means responsive to said low frequency series and operative to generate a first gate signal coincident with said low series,
   a second gate means responsive to said high frequency series and operative to generate a second gate signal coincident with said high series,
   first filter means including a first capacitor means which is charged during said first gate signal to develop a first filtered signal and is discharged in the absence thereof,
   second filter means including a second capacitor means which is charged during said second gate signal to develop a second filtered signal and is dischargd in the absence thereof,
   a third gate means having a first input for receiving said first filtered signal and a second input for receiving said second filtered input a first feedback circuit coupling the output of said thrd gate means to said first input and a second feedback circuit coupling said third gate output to said second input whereby a validity signal is developed at said third gate output when both said first filtered signal and said second filtered signal exceed first predetermined levels said validity signal existing so long as both said first and second filtered signals remain above second predetermined levels.

* * * * *